March 18, 1969 J. A. McDONALD 3,434,000
STABILIZATION OF TELEVISION DEFLECTION CIRCUITS
Filed April 25, 1966
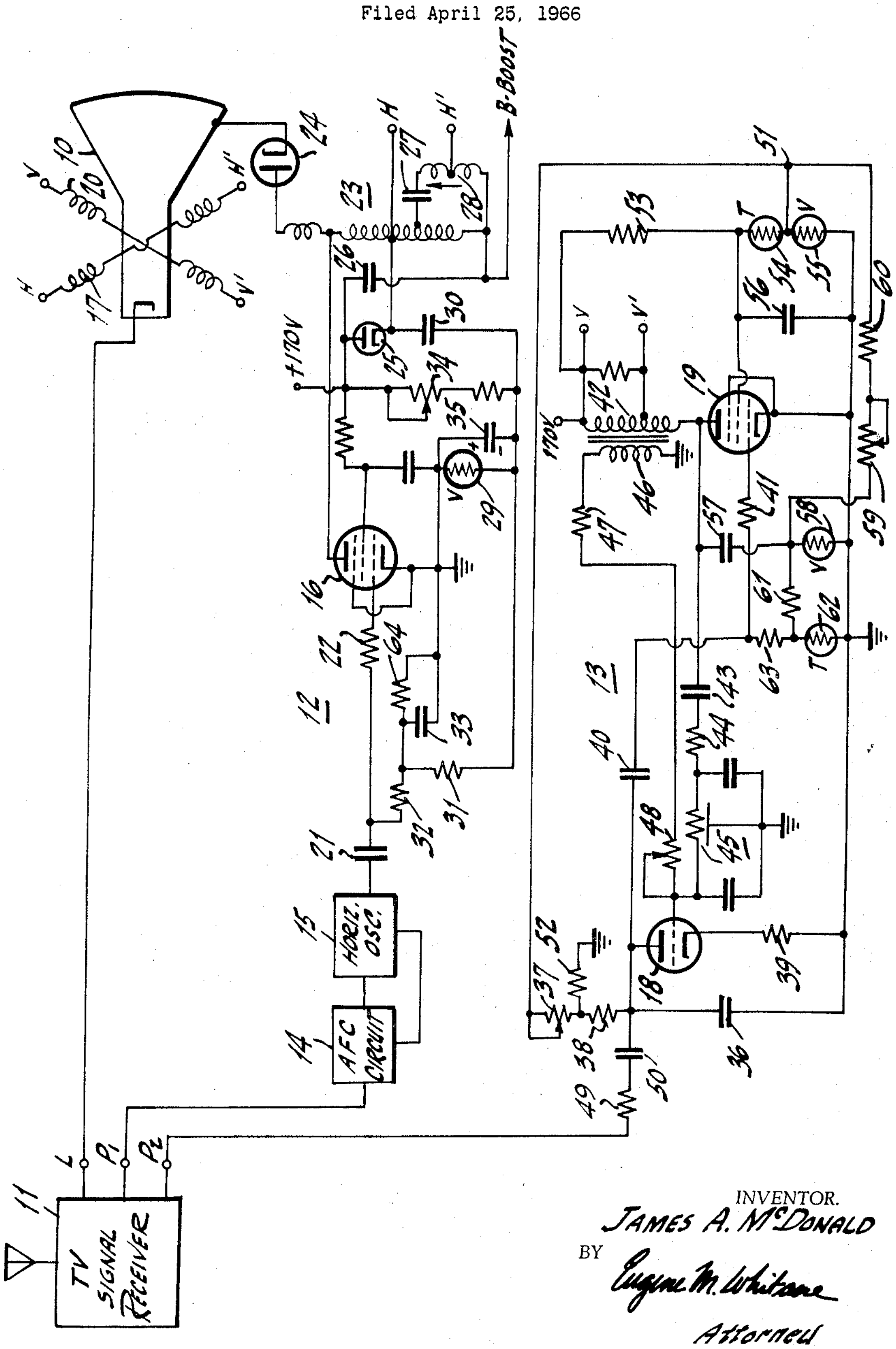
INVENTOR.
JAMES A. McDONALD
BY Eugene M. Whitacre
Attorney 3,434,000

STABILIZATION OF TELEVISION DEFLECTION CIRCUITS

James Alexander McDonald, Indianapolis, Ind., assignor to Radio Corporation of America, a corporation of Delaware Filed Apr. 25, 1966, Ser. No. 544,906
U.S. Cl. 315—27 7 Claims
Int. Cl. H01j 29/70

ABSTRACT OF THE DISCLOSURE

In a television receiver, horizontal and vertical deflection circuits are stabilized so as to reduce the effect of line voltage changes on image height, linearity and width and also to reduce the effect of ambient temperature changes on image height and vertical linearity. A voltage dependent resistor is associated with a feedback bias arrangement in the horizontal stage while a combination of voltage dependent resistors and temperature dependent resistors are associated with the vertical deflection circuit.

This invention relates to television receiver circuits, and more particularly, to means for stabilizing the deflection circuits of a television receiver against variations of power line voltage and operating temperature.

In a television receiver, images are produced on the screen of a cathode ray tube by scanning an electron beam in a regular pattern across the screen and simultaneously varying the electron beam current according to variations in the brightness of the image which is to be reproduced. In general, commercial television receivers utilize electromagnetic deflection means for scanning the electron beam over the screen of a cathode ray tube in both the horizontal and vertical directions.

When the horizontal deflection circuit is stabilized against line voltage variations, a degree of stabilization of the high voltage applied to the cathode ray tube for electron beam acceleration is also achieved. In view of this latter effect, in order to maintain image height substantially constant, it then also becomes desirable to provide means for stabilizing the operation of the vertical deflection circuit as line voltage changes.

In accordance with the present invention, means are provided for reducing substantially the effect of power line voltage variations and ambient temperature variations on the height, width and linearity of the television image.

In a preferred embodiment of the invention, the vertical deflection circuit comprises a vertical output stage including a control electrode to which a stabilizing operating bias is applied. The stabilizing bias is derived from a compensated supply voltage source including a first voltage dependent resistor (VDR) and, in a particular embodiment of the invention, a first temperature dependent resistor (thermistor). The supply voltage source is coupled to a voltage divider circuit comprising the series combination of a variable resistor and a second voltage dependent resistor (VDR). The second VDR is further coupled to the output electrode of the vertical output stage for deriving, in conjunction with the compensated supply voltage source, a control effect related to the amplitude of the vertical output signal. The control effect is applied to a temperature sensitive network including a second thermistor. The output of the network constitutes the desired stabilizing operating bias for the control electrode of the vertical output stage.

In accordance with a further aspect of the invention, the compensated supply voltage source is also coupled to a sawtooth generating network, including a capacitor, for producing an input waveform for application to the control electrode of the vertical output stage.

In accordance with a still further aspect of the invention, means are provided in an associated horizontal deflection circuit for maintaining horizontal image size and cathode ray tube high voltage substantially constant despite supply voltage changes.

The novel features that are considered characteristic of this invention are set forth with particularity in the appended claims. The invention itself, however, both as to its organization and method of operation as well as additional objects and advantages thereof will best be understood from the following description when read in connection with the accompanying drawing.

In the drawing, the circuits of a television receiver serving to provide signals to energize an image reproducing device such as a kinescope 10 are represented by a single block 11 labelled, "Television Signal Receiver." The receiver unit incorporates the usual elements required to provide video signals (at output terminal L) for appropriate intensity modulation of the electron beam of kinescope 10, as well as to provide suitable synchronizing pulse information (at terminals $P_1$ and $P_2$) to synchronize, in respective horizontal and vertical deflection circuits 12 and 13, the energization of the respective windings 17 and 20 of the deflection yoke associated with kinescope 10.

The horizontal synchronizing pulses are applied from terminal $P_1$ to an automatic frequency control (AFC) circuit 14. AFC circuit 14 is coupled to a horizontal deflection waveform generating circuit which includes a horizontal oscillator 15 and a horizontal output stage 16. The output terminals H, H′ associated with horizontal output stage 16 are coupled, as will be explained more fully below, to the similarly labelled terminals H, H′ of the horizontal deflection winding 17 associated with kinescope 10.

Vertical synchronizing pulses are supplied from terminal $P_2$ to vertical deflection circuit 13 which includes a vertical oscillator stage 18 and a vertical output stage 19. The output terminals V, V′ associated with vertical output stage 19 are coupled to the similarly labelled terminals V, V′ of a vertical deflection winding 20 associated with kinescope 10.

In horizontal deflection circuit 12, an approximately sawtooth voltage recurring at the horizontal scanning frequency is produced by horizontal oscillator 15 and applied via a capacitor 21 and a resistor 22 to the first control grid of a pentode type horizontal output stage 16. Associated with the horizontal output stage 16 is a multisectioned output transformer 23 to which are coupled a high voltage rectifier 24, a damper diode 25, and a boost capacitor 26, one terminal of capacitor 26 and the plate electrode of diode 25 being coupled together to a B+ voltage supply (+170 volts). The output terminals H, H′ associated with horizontal deflection winding 17 are coupled by means of a DC blocking capacitor 27 and one-half of a variable horizontal linearity control inductance 28 across a portion of output transformer 23.

A compensating circuit which includes a voltage dependent resistor (VDR) 29 and a capacitor 30 for coupling VDR 29 to output transformer 23 provides a varying negative bias voltage to the first control grid of horizontal output stage 16 by means of a filtering circuit including resistors 31 and 32 and capacitor 33. A variable width control resistor 34 is coupled between the B+ voltage supply and the junction point of capacitor 30 and VDR 29 so as to vary the bias applied to horizontal output stage 16 as will be explained more fully below. A capacitor 35 is coupled from the junction point of VDR 29 and capacitor 30 to chassis ground, the effective capacitance of the series combination of capacitors 30 and 35 being arranged to provide the necessary retrace capacitance.

In the vertical deflection circuit 13, a substantially sawtooth voltage waveform is produced across a capacitor 36 by means of alternate charging through a path including a variable linearity control resistor 37 and a fixed resistor 38 and discharging through the path including oscillator stage 18 and cathode resistor 39. The sawtooth voltage is coupled by means of a capacitor 40 and a resistor 41 to the control grid of a pentode type vertical output stage 19. The plate electrode of output stage 19 is coupled to the B+ voltage supply (170 v.) by means of an output transformer winding 42. Plate current variations which are produced in output stage 19 as a result of the sawtooth voltage applied to the grid thereof flow through transformer winding 42 to produce in vertical deflection winding 20 (coupled to terminals V, V′) the required sawtooth deflection current waveform.

Oscillations are maintained in the circuit by positive feedback from the plate of output stage 19 to the grid of oscillator 18 via a pulse shaping network comprising a capacitor 43, a resistor 44 and an integrating network 45. A second feedback path is provided for producing a substantially parabolic voltage waveform to modify the signal applied to the control grid of oscillator 18. The second feedback path comprises a transformer winding 46 inductively coupled to transformer winding 42, a resistor 47, and a variable hold control resistor 48. The frequency of oscillation of oscillator stage 18 is adjusted by means of hold control 48. After initial adjustment of hold control 48, the oscillation frequency is maintained by means of vertical synchronizing pulses supplied from terminal $P_2$ to the grid of output stage 19 via a resistor 49, a capacitor 50, capacitor 40 and resistor 41.

The amplitude of the charging voltage supplied to capacitor 36 may be adjusted by means of the variable linearity control resistor 37, one end of which is returned to a compensated positive voltage supply at terminal 51 and the other end of which is returned to ground via a resistor 52. The voltage present at terminal 51 is derived from the B+ voltage supply but is compensated, in accordance with the present invention, by means of a voltage divider arrangement comprising a resistor 53, a thermistor 54 and a voltage dependent resistor 55. A filter capacitor 56 is coupled across the series combination of thermistor 54 and VDR 55. The screen grid of vertical output stage 19 is supplied with the filtered direct voltage provided at the junction of resistor 53 and capacitor 56.

In accordance with one aspect of the present invention, a stabilizing operating bias is applied to the control grid of output stage 19 via resistor 41 in the following manner. The output of vertical output stage 19 is coupled by means of a capacitor 57 to a VDR 58. A compensated positive direct voltage is coupled to the junction of capacitor 57 and VDR 58 by means of the combination of a variable height control resistor 59 and a fixed resistor 60, resistor 60 being connected at one end to terminal 51 at which the compensated positive voltage is supplied. A temperature compensating voltage divider comprising a resistor 61 and a thermistor 62 is coupled across VDR 58. A compensated control effect produced at the junction of resistor 61 and thermistor 62 is then coupled by means of a resistor 63 and resistor 41 to the control grid of vertical output stage 19.

In the operation of horizontal and vertical deflection circuits 12 and 13, the deflection waveforms produced across respective transformers 23 and 42 are characterized by relatively short duration, positive polarity voltage pulses occurring during the retrace portion of each of the respective deflection cycles, the amplitudes of such retrace pulses are substantially greater than the amplitudes of the voltage waveforms produced across the respective output transformers during trace portions of the deflection cycles. Furthermore, the amplitudes of the retrace pulses are dependent upon the deflection current which flows through a particular output transformer during the trace portion of a deflection cycle, the trace current amplitude being determinative of the size (i.e. height or width as the case may be) of the image produced on kinescope 10 and furthermore being dependent, at least in part, upon the positive supply voltage applied to the plate of the respective output tube. The positive plate supply voltage is dependent upon the power line voltage supplied to the television receiver. Variations in power line voltage normally are directly reflected in the amplitude of both the horizontal and vertical retrace pulses as outlined above.

The deflection circuits 12 and 13 are therefore provided with means for sensing variations in associated retrace pulse amplitude (indicative of supply voltage variations) and for producing in response thereto a change in the bias applied to the control electrode of the appropriate deflection output stage, thereby changing the gain of such stage in a compensating manner to maintain image size substantially constant.

In the horizontal deflection circuit 12, capacitor 30, VDR 29 and width control 34 provide a circuit responsive to changes in the amplitude of the horizontal retrace pulses for varying the operating characteristics (e.g., grid bias) of horizontal output tube 16 so as to substantially reduce variations in image width. Specifically, VDR 29 exhibits a relatively low resistance when subjected to a high voltage and exhibits a relatively high resistance when subjected to a low voltage. The horizontal output waveform is applied through the capacitor 30 to the VDR 29. The average resistance of the VDR 29 to the positive going portions of the wave including the high voltage retrace pulse is less than the average resistance to the negative going portions of the wave. In this respect, the VDR acts as a variable efficiency rectifier and causes a negative voltage to be developed across the capacitor 35 relative to ground. VDR 29 in conjunction with capacitor 30 therefore serves to develop a negative bias voltage dependent upon the amplitude of the horizontal retrace pulses. For example, a decrease in power line voltage results in a decrease in the amplitude of the horizontal retrace pulse which, in turn, results in the production of a less negative voltage across VDR 29. The resulting decrease in grid bias applied to horizontal output stage 16 causes the gain of stage 16 to increase, thereby varying the output current produced by output stage 21 so as to compensate for the reduction in image width which otherwise would occur. An opposite compensating action occurs on an increase in power line voltage. Image width is therefore substantially stabilized despite variations in power line voltage.

As a consequence of the stabilization of horizontal deflection circuit 12, the magnitude of the high voltage applied to cathode ray tube 10 by means of high voltage rectifier 24 (which is dependent upon the horizontal retrace pulse amplitude) is also maintained substantially constant despite variations in power line voltage. It therefore becomes desirable to provide compensating means associated with vertical deflection circuit 13 for maintaining image height substantially constant as power line voltage varies to maintain the desired aspect ratio.

Furthermore, because of the relatively significant effect of temperature upon the impedance of the substantially resistive vertical deflection winding 20 (i.e., winding resistance increases with temperature) and because of the significant dependence upon temperature of the relatively long time constant associated with other circuit elements (capacitors) utilized in generating the vertical deflection waveform (capacitance increases with temperature), it also becomes desirable to provide temperature compensation elements in vertical deflection circuit 13.

In vertical deflection circuit 13, the compensated supply voltage source comprising the series combination of resistor 53, thermistor 54 and VDR 55 coupled across the B+ voltage supply (+170 v.) provides a supply voltage in which the effect of line voltage variations is substantially reduced and, furthermore, provides a supply voltage which changes in a predetermined compensatory manner as the ambient temperature associated with vertical deflection circuit 13 changes (i.e., supply voltage increases as temperature increases). The compensated voltage provided at terminal 51 is supplied to two portions of the vertical deflection circuit.

First, the sawtooth generating circuit comprising linearity control 37, resistor 38 and capacitor 36 is coupled to terminal 51. As line voltage varies, the resistance of VDR 55 changes to reduce substantially the effect of such variations on the voltage at terminal 51 thereby maintaining vertical linearity substantially constant. As temperature varies, however, the resistance of thermistor 54 varies so as to cause the voltage at terminal 51 to change in a manner to compensate for variations which otherwise would occur in vertical linearity. Specifically, as temperature increases, the resistance of thermistor 54 decreases and the voltage at terminal 51 increases, compensating for the change in circuit component values with temperature.

Secondly, the grid bias circuit of vertical output stage 19 is coupled via size control 59 and resistor 60 to terminal 51. A positive voltage stabilized against line voltage changes and compensated to a degree for temperature changes is therefore supplied to the junction of capacitor 57 and VDR 58. Circuit elements 57 and 58 in a manner similar to the operation of capacitor 30 and VDR 29 in horizontal deflection circuit 12 serve to derive from the output of vertical output stage 19 a negative voltage indicative of the amplitude of the vertical retrace pulse. It is desirable to apply to the VDR 58 as much as the amplitude of the vertical waveform as is possible (i.e., operate on a steep portion of the VDR characteristic during retrace). A significant change in resistance then may be obtained as a function of applied voltage. However, consideration must also be given to the permissible level of negative bias voltage which can be applied to vertical output stage 19 in selecting the resultant negative voltage which will be produced across VDR 58. In order to permit application of a high level pulse waveform without producing an excessive resultant negative voltage across VDR 58, the compensated positive supply voltage is added via size control 59 to the negative voltage at the junction of capacitor 57 and VDR 58. Variations in the vertical retrace pulse amplitude (indicative of line voltage variations) are accentuated since much of the relatively fixed portion of the direct voltage produced across capacitor 57 is effectively cancelled out across VDR 58 by the application of the compensated relatively fixed positive supply voltage. Size control 59 may be adjusted to vary the positive voltage component and thereby vary the effective negative grid bias applied to output stage 19. The gain of output stage 19 and hence the image height are thereby controllable. Furthermore, the circuit location of size control 59 makes it possible to compensate for expected manufacturing tolerances between VDR's utilized in the circuit position occupied by VDR 58. That is, the effect of variations in current versus voltage characteristics between one VDR and another may be substantially eliminated by adjustment of size control 59.

Further temperature compensation (related to the characteristics of vertical deflection winding 20) is provided by means of the voltage divider comprising resistor 61 and thermistor 62. A resultant control effect or bias is applied to the control grid of output stage 19 to maintain vertical size substantially constant as line voltage and temperature change. Specifically, as temperature increases, the bias voltage applied to the output stage 19 is caused to decrease as a result of the operation of thermistor 62, thereby increasing the gain of output stage 19 to maintain vertical size substantially constant.

A circuit of the type shown in the drawing in which the advantages of the present invention are realized may be constructed utilizing the following components:

| | |
|---|---|
| Horizontal output stage **16** | Tube type 6JF6. |
| Vertical oscillator stage **18** | Triode of 6KY8. |
| Vertical output stage **19** | Pentode of 6KY8. |
| Capacitor **21** | .0033 microfarad. |
| Resistor **22** | 47 ohms. |
| High voltage rectifier **24** | Type 1B3. |
| Diode **25** | Type 6CK3. |
| Capacitor **26** | .047 microfarad. |
| VDR **29** | 320 volts at 1 milliampere. |
| Capacitor **30** | 160 picofarads. |
| Resistor **31** | 820,000 ohms. |
| Resistor **32** | 820,000 ohms. |
| Capacitor **33** | .033 microfarad. |
| Width control **34** | 1 megohm (variable). |
| Capacitor **35** | 640 picofarads. |
| Capacitor **36** | .033 microfarad. |
| Linearity control **37** | 170,000 ohms (variable). |
| Resistor **38** | 470 ohms. |
| Resistor **39** | 3300 ohms. |
| Capacitor **40** | .047 microfarad. |
| Resistor **41** | 1,000 ohms. |
| Capacitor **43** | .0027 microfarad. |
| Resistor **44** | 27,000 ohms. |
| Resistor **47** | 470,000 ohms. |
| Hold control **48** | 750,000 ohms (variable). |
| Resistor **49** | 47,000 ohms. |
| Capacitor **50** | .0039 microfarad. |
| Resistor **52** | 270,000 ohms. |
| Resistor **53** | 1,000 ohms. |
| Thermistor **54** | 30,000 ohms at 25° C. |
| VDR **55** | 320 volts at 1 milliampere. |
| Capacitor **56** | 150 microfarads. |
| Capacitor **57** | .022 microfarad. |
| VDR **58** | 320 volts at 1 milliampere. |
| Size control **59** | 5 megohms (variable). |
| Resistor **60** | 470,000 ohms. |
| Resistor **61** | 1 megohm. |
| Thermistor **62** | 1.5 megohms at 25° C. |
| Resistor **63** | 1.8 megohms. |
| Resistor **64** | 1.2 megohms. |

What is claimed is:

1. In a television receiver having a cathode ray image reproducing tube and an electromagnetic deflection yoke for said tube including vertical deflection windings, a vertical deflection circuit comprising in combination:

circuit means for developing a substantially sawtooth voltage waveform;

an amplifying device having an input electrode and an output electrode;

means for applying said sawtooth voltage to the input electrode of said device;

means for connecting the output electrode of said device to said vertical deflection windings for applying deflection current to said windings and for developing vertical retrace voltage pulses;

means including a voltage dependent resistor responsive to said vertical retrace voltage pulses for developing a direct control voltage having an amplitude dependent upon the amplitude of said vertical retrace voltage pulses;

a stabilized source of direct voltage of opposite polarity with respect to said control voltage;

a first variable resistance means coupled between said stabilized source and said voltage dependent resistor for producing in conjunction with said resistor a varying control effect wherein variations in said retrace voltage pulse amplitude are accentuated, and means for applying said control effect to the input electrode of said amplifying device to maintain the amplitude of said deflection current substantially constant.

2. The combination according to claim 1 wherein said sawtooth voltage developing circuit means comprises a capacitor;

charging circuit means for said capacitor including a second variable resistance coupled to said stabilized source of direct voltage; and discharge circuit means coupled across said capacitor for discharging said capaictor during the occurrence of said vertical retrace voltage pulses.

3. The combination according to claim 2 wherein said first variable resistance is arranged to vary the amplitude and said second variable resistance is arranged to vary the linearity of the deflection current applied to said vertical deflection windings.

4. The combination according to claim 3 and further comprising first temperature sensitive means coupled to said stabilized source of direct voltage for maintaining vertical linearity substantially constant as ambient temperature changes.

5. The combination according to claim 4 and further comprising second temperature sensitive means coupled across said vertical retrace voltage pulse responsive means for maintaining vertical amplitude substantially constant as ambient temperature changes.

6. The combination according to claim 5 wherein said stabilized source of direct voltage comprises the series combination of a thermistor and a voltage dependent resistor coupled across a direct voltage supply subject to variations, said stabilized source being provided at the junction of said thermistor and said voltage dependent resistor.

7. In a television receiver having a cathode ray image reproducing tube and an electromagnetic deflection yoke including horizontal and vertical deflection windings for scanning an electron beam over the face of said tube in a regular scanning pattern, the combination comprising:

horizontal deflection means including a horizontal output amplifier for developing a horizontal scanning waveform, the waveform including relatively high voltage horizontal retrace pulses, circuit means including a high voltage rectifier coupled to said horizontal deflection means for applying high voltage to said cathode ray tube, compensating means responsive to said retrace pulses for developing a first direct control voltage having an amplitude dependent upon the amplitude of said horizontal retrace pulses, means for applying said first direct control voltage to said horizontal output amplifier to vary the amplitude of said horizontal scanning waveform so as to maintain the width of said scanning pattern substantially constant, the combination further comprising vertical deflection means comprising circuit means for developing a substantially sawtooth voltage waveform;

an amplifying device having an input electrode and an output electrode;

means for applying said sawtooth voltage to the input electrode of said device;

means for connecting the output electrode of said device to said vertical deflection windings for applying deflection current to said windings and for developing vertical retrace voltage pulses;

means including a voltage dependent resistor responsive to said vertical retrace voltage pulses for developing a second direct control voltage having an amplitude dependent upon the amplitude of said vertical retrace voltage pulses;

a stabilized source of direct voltage of opposite polarity with respect to said second control voltage, a first variable resistance means coupled between said stabilized source and said voltage dependent resistor for producing in conjunction with said resistor a varying control effect wherein variations in said vertical retrace voltage pulse amplitude are accentuated and means for applying said control effect to the input electrode of said amplifying device to maintain the amplitude of said vertical deflection current substantially constant whereby the width and height of said scanning pattern are maintained substantially constant.

References Cited

UNITED STATES PATENTS

| | | | |
|---|---|---|---|
| 3,007,079 | 10/1961 | Schuster | 315—27 |
| 3,233,143 | 2/1966 | Meyer | 315—27 |

RODNEY D. BENNETT, Jr., *Primary Examiner.*

JOSEPH G. BAXTER, *Assistant Examiner.*

UNITED STATES PATENT OFFICE
CERTIFICATE OF CORRECTION

Patent No. 3,434,000 March 18, 1969

James Alexander McDonald

It is certified that error appears in the above identified patent and that said Letters Patent are hereby corrected as shown below:

Column 6, line 31, "VDR 55 --- 320 volts at 1 milliampere" should read -- VDR 55 --- 110 volts at 1 milliampere --.

Signed and sealed this 7th day of April 1970.

(SEAL)
Attest:

Edward M. Fletcher, Jr.
Attesting Officer

WILLIAM E. SCHUYLER, JR.
Commissioner of Patents